(12) United States Patent
Kia et al.

(10) Patent No.: US 6,699,419 B1
(45) Date of Patent: Mar. 2, 2004

(54) METHOD OF FORMING A COMPOSITE ARTICLE WITH A TEXTURED SURFACE AND MOLD THEREFOR

(75) Inventors: Hamid Ghavami Kia, Bloomfield Hills, MI (US); Sheila Farrokhalaee Kia, Bloomfield Hills, MI (US); Joseph C. Simmer, Sterling Heights, MI (US); Terrence James Wathen, Sterling Heights, MI (US); Mark A. Buffa, Utica, MI (US)

(73) Assignee: General Motors Corporation, Detroit, MI (US)

( * ) Notice: Subject to any disclaimer, the term of this patent is extended or adjusted under 35 U.S.C. 154(b) by 310 days.

(21) Appl. No.: 09/587,393

(22) Filed: Jun. 5, 2000

(51) Int. Cl.⁷ .......................... B29C 41/02; B29C 33/60
(52) U.S. Cl. ........... 264/219; 264/221; 264/255; 264/257; 264/264; 264/319; 264/225; 264/241
(58) Field of Search .................. 264/219, 220, 264/221, 225, 226, 255, 257, 264, 293, 337, 338, 324, 319, 266, 241

(56) References Cited

U.S. PATENT DOCUMENTS

| | | | | |
|---|---|---|---|---|
| 4,285,744 A | * | 8/1981 | Rudolf et al. | 264/491 |
| 4,308,224 A | * | 12/1981 | Becker | 264/451 |
| 4,367,110 A | * | 1/1983 | Yoshikawa | 156/219 |
| 4,518,722 A | * | 5/1985 | Schutt et al. | 523/135 |
| 4,959,250 A | * | 9/1990 | McKinnon | 428/15 |
| 5,310,095 A | * | 5/1994 | Stern et al. | 222/402.1 |
| 5,344,692 A | * | 9/1994 | Schmoock | 428/161 |
| 5,688,851 A | * | 11/1997 | Kress | 524/430 |
| 5,782,289 A | * | 7/1998 | Mastrorio et al. | 164/516 |
| 6,312,484 B1 | * | 11/2001 | Chou et al. | 51/298 |

FOREIGN PATENT DOCUMENTS

| EP | 0 552 918 A1 | * | 7/1993 |
|---|---|---|---|
| JP | 61-44625 | * | 3/1986 |

* cited by examiner

Primary Examiner—Stefan Staicovici
(74) Attorney, Agent, or Firm—Kathryn A. Marra

(57) ABSTRACT

A molding process that uses a textured interfacial layer to isolate the surface of a mold from the surface of a composite article produced with the mold. A solution is deposited on the mold surface to form the interfacial layer, whose surface opposite the mold is textured. The texture of the interfacial layer is then transferred to the surface of the composite article produced with the mold. After demolding, the interfacial layer adheres to the article as a protective coating, but can be readily removed from the article to expose an underlying textured surface of the article.

7 Claims, 1 Drawing Sheet

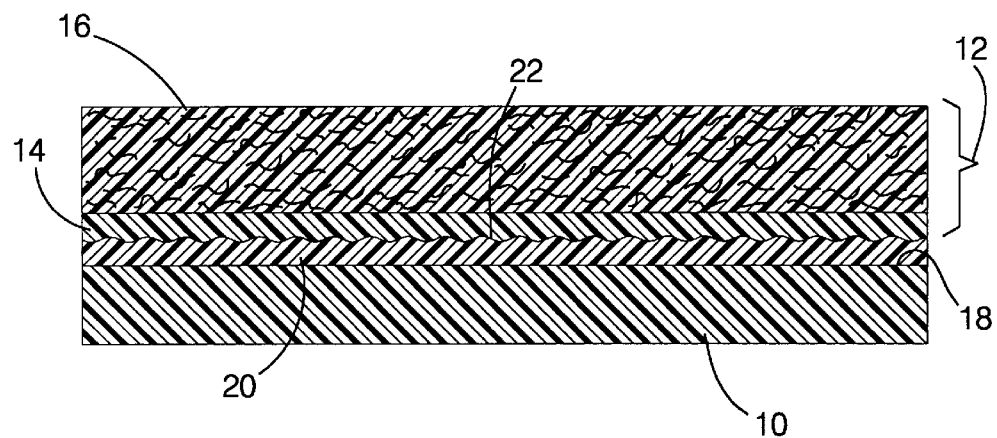

METHOD OF FORMING A COMPOSITE ARTICLE WITH A TEXTURED SURFACE AND MOLD THEREFOR

TECHNICAL FIELD

The present invention generally relates to a method for producing textured composite articles. More particularly, this invention relates to a method by which a textured surface is produced on a composite article through the use of a textured interfacial layer that is applied to the mold in which the article is subsequently formed, and wherein the textured interfacial layer is retained on the article surface after the molding operation as a removable protective coating that when removed exposes the textured surface of the article.

BACKGROUND OF THE INVENTION

Open tool molding is a process for producing relatively low-cost composite panels at low volumes. While steel molds are often used for other molding operations, the open tool molding process was developed to use less expensive one-sided epoxy or polyester molds to produce various products, such as recreational vehicle (RV) composite panels with an in-mold finish. In this process, the mold surface is cleaned and waxed, after which a layer of gel coat is applied and then partially cured. A laminate is then applied to the gel coat layer, and the laminate and gel coat are cured to form a unitary part having a surface that is defined by the cured gel coat. Molded parts can be produced by this method to have a class A finish bearing any desired color originally carried by the gel coat.

While the use of a low-cost epoxy or polyester mold offers significant cost advantages over other molding methods used to produce composite articles, there are certain limitations imposed by a polymeric mold. One such example is the molding of panels, such as automotive interior panels, for which a textured finish is desired. In the past, plastic textured panels have been made by either injection molding or compression molding using steel molds. A grained profile is formed on the surface of the steel mold during the tool making process. The grained surface profile is then transferred onto the surface of the molded parts, creating a textured surface finish. Because of the hardness of the steel molds, the grained surfaces maintain their appearance for many years of production. In contrast, polymeric molds do not have the same level of hardness and, therefore, a grained surface created on a polymeric mold wears out quickly. The vertical walls of a grained polymeric mold are particularly vulnerable to wear during demolding, with the result that an uneven surface finish is produced after molding only a few parts. Consequently, polymeric open tool molds have been generally limited to molding articles with smooth, glossy surfaces.

In view of the above, it would be desirable if a method were available for producing composite articles with a textured finish using a low-cost polymeric mold whose mold surfaces are not damaged by the molding operation.

SUMMARY OF THE INVENTION

The present invention is directed to a molding process that uses an interfacial layer to isolate the surface of the mold from the surface of a composite article produced with the mold. According to the invention, a solution can be deposited on the mold surface to form the interfacial layer, whose surface opposite the mold surface is textured. The texture of the interfacial layer is then transferred to the surface of the composite article produced with the mold. After demolding, the interfacial layer is removed from the article to expose an underlying textured surface of the article.

A suitable molding process of the present invention generally entails spraying a polymeric solution on an untextured mold surface of a mold so that the polymeric solution forms the textured interfacial layer of this invention. According to the invention, certain spray techniques are capable of depositing a polymeric solution to produce an interfacial layer whose outer surface texture can be controlled by the spray parameters, such as pressure and spray gun orifice size. A composite material is then deposited on the textured interfacial layer so that the composite material contacts the textured interfacial layer and has a surface that is textured by the interfacial layer. The composite material and the textured interfacial layer are then cured so that the composite material forms a composite article having a textured surface, and so that the textured interfacial layer clings to the textured article surface. The textured interfacial layer can then be immediately removed from the composite article, or left on the article as a temporary protective coating during shipping and handling and then later removed prior to or after the article is installed or assembled with other components.

In view of the above, a significant advantage of this invention is that an open tool mold can be fabricated to have smooth mold surfaces, with the interfacial layer being the sole means for producing a textured surface on an article produced with the mold. As a result, molds formed from lower cost and less durable materials, particularly polymers such as epoxies and polyesters, can be used to produce articles with textured surfaces, without quickly damaging or wearing out the mold surfaces.

Other objects and advantages of this invention will be better appreciated from the following detailed description.

BRIEF DESCRIPTION OF THE DRAWINGS

The drawing FIGURE represents a cross-sectional view of an open tool mold for producing a composite article with a textured surface in accordance with the present invention.

DESCRIPTION OF THE PREFERRED EMBODIMENT

The present invention is the result of an investigation directed to developing alternative methods for producing textured fiberglass composites using the open tool molding process. As discussed previously, current technology has required the construction of a steel mold with a textured mold surface to produced textured composite articles. The present invention avoids the high cost of texturing a steel mold through the use of a removable textured interfacial layer, which allows less durable mold materials to be used as low-cost replacements for a textured steel mold. According to the present invention, when properly sprayed onto a smooth open tool mold, a polymeric solution can be dried to form an interfacial layer having a surface texture that can be negatively cast onto a composite article produced with the mold, thereby generating a textured surface on the article. When the article is demolded, the interfacial layer releases from the mold and adheres to the textured surface of the article. The interfacial layer can then serve as a protective layer to reduce the risk of scratching or marring the textured surface of the article during handling and storage. At any time after molding, the interfacial layer can be readily removed from the composite article to reveal the textured article surface. For example, the textured interfacial layer can be removed from the article after the article has been transported to another facility for assembly or installation.

Illustrated in the drawing FIGURE is a cross section through a portion of an open tool mold 10 on which a composite article 12 is in the process of being cast. As is typical in the art, the article 12 is formed by depositing a gel coat layer 14, over which a fiber-reinforced laminate 16 is applied. Following curing in the mold 10, the gel coat layer 14 and laminate 16 form the unitary article 12 whose outer surface is defined by the cured gel coat layer 14. Various compositions can be employed for the gel coat layer 14 and laminate 16. Because the gel coat layer 14 defines the outer surface of the article 12 after molding, the materials for the gel coat layer 14 and laminate 16 must be compatible. In one embodiment that achieved particularly desirable processing and wetting properties, the laminate 16 was formed by a mixture of one-inch (about 25 mm) long glass fibers and a resin chemistry containing:

- 100 parts of an unsaturated polyester resin with a styrene monomer content of about 32%, available from Alpha/Owens-Corning under the name H834. The resin is a maleic anhydride-based unsaturated polyester modified with dicyclopentadiene, and contains a thixotrope and cobalt 2-ethylhexanoate as a promoter that reacts with methyl ethyl ketone peroxides (MEKP) to facilitate curing at room temperature. The resin has a specific gravity of about 1.100 g/cc and a Brookfield viscosity of about 670 cps using an RVF viscometer at 20 rpm with a #3 spindle.
- 0.81 parts of a wetting and dispersing additive having a specific gravity of about 1.010 g/cc and available from BYK under the name W-972.
- 0.23 parts of a wetting and dispersing additive having a specific gravity of about 0.930 g/cc and available from BYK under the name R-605.
- 0.23 parts of a silicon-free air release additive available from BYK A-555 to reduce foaming.
- 23 parts of a calcium carbonate ($CaCO_3$) powder with a particle size of about 5 micrometers.
- 1.23 parts of a fumed silica thixotrope available from Cab-O-Sil under the name TR-720; specific gravity of about 0.050 g/cc.
- 1.50 parts of a methyl ethyl ketone peroxide (MEKP) available from Elf Atochem NA under the name DDM-9; specific gravity of about 1.084 g/cc.

The gel coat layer 14 was a polyester-based material, and therefore chemically compatible with the laminate 16. Suitable thicknesses for the gel coat layer 14 and laminate 16 are about 0.5 mm and about 3 mm, respectively, though it is foreseeable that various thicknesses could be used. Because the outer surface of the article 12 is defined by the cured gel coat layer 14, it is often desirable that the gel coat layer 14 contain pigmentation to produce a particular color desired for the article 12.

Also shown in the drawing FIGURE is an interfacial layer 20 between the surface 18 of the mold 10 and the article 12. As depicted in the drawing FIGURE, the surface 18 of the mold 10 is smooth while the surface 22 of the interfacial layer 20 opposite the mold 10 is textured. Accordingly, the surface 22 of the interfacial layer 20 defines the molding surface to the article 12, such that the surface 18 of the mold 10 is not subject to damage and wear during the process of removing the article 12 from the mold 10. Therefore, a particular feature of this invention is that the mold 10 can be formed from materials that are far less durable and wear-resistant than steel, including polymers such as epoxies and polyesters. However, it is foreseeable that the advantages of this invention could be realized with other types of mold tooling and other mold materials.

According to the invention, the interfacial layer 20 can be formed to have a desired surface texture by spraying an appropriate polymeric material onto the mold surface 18. Suitable polymeric materials include polyvinyl acetate solutions and acrylic latex emulsions, though other film-forming materials could foreseeably be used. A variety of factors were considered in the development of the present invention. For instance, in addition to being appealing to the eye and touch, the texture produced on the article 10 should be consistent throughout the part and repeatable from part to part. Also, in order to be easily removed, the interfacial layer 20 should not chemically react with the gel coat layer 14 or the mold 10. Furthermore, the interfacial layer 20 should have an acceptable cure time and minimal thickness to be cost effective. As will be evident from the following discussion, investigations leading to the present invention evidenced that the spraying technique and thickness of the interfacial layer 20 can and must be appropriately controlled to produce the desired degree of texturing for the coating surface 22 and to promote the ease with which the interfacial layer 20 is subsequently removed from the article 12 after the molding operation.

The steps generally entailed in producing the composite article 12 in accordance with the drawing figure are to first clean and then deposit a suitable mold release agent on the surface 18 of the mold 10. The interfacial layer 20 is then deposited to a suitable thickness and dried before spraying a gel coat material on the interfacial layer 20 to form the gel coat layer 14. A second layer of mold release agent may be directly applied to the surface of the interfacial layer 20 prior to forming the gel coat layer 14 in order to facilitate later removal of the interfacial layer 20 from the article 12. The gel coat layer 14 is then partially cured, after which the laminate 16 is applied. The interfacial layer 20, gel coat layer 14 and laminate 16 are then fully cured before demolding, yielding the article 12 having a textured surface defined in the gel coat layer 14 and covered by the interfacial layer 20, which can be removed at any desired time.

In a series of investigations leading to the present invention, an acrylic latex emulsion commercially available from AC Products under the name AC940-Blue was used in the form of an aqueous solution. The emulsion was used as received or diluted by about 10% deionized water. Various spray techniques and equipment were evaluated in the investigation, including gravity pot, siphon pot and pressure pot spray guns, and electric and airless pumps equipped with various nozzles. In one investigation, it was shown that if the interfacial layer thickness is not sufficient, the process of removing the interfacial layer 20 is often difficult and time consuming. On the other hand, an excessive interfacial layer thickness unnecessarily increases manufacturing costs. Therefore, studies were conducted with 1×1 ft. (about 0.3× 0.3 m) flat glass molds prepared with a mold release agent commercially available from Meguair under the name Mirror Glaze #8 Maximum Mold Release Wax. Interfacial layers 20 were formed by spraying a coating solution on the molds using a Binks (MODEL M1-G) gravity-feed high-volume low-pressure (HVLP) spray gun using a spray tip number 10 and an air pressure of about 15 psi (about 1 bar). The coating solution was prepared by diluting the acrylic latex emulsion noted above with deionized water in a 10:1 emulsion:water ratio. The molds were placed in a paint spray booth at nominal room temperature and humidity levels, with airflow through the booth set to produce a slight negative pressure. The coating solution was sprayed onto the molds to produce various wet film thicknesses as measured by a Binks wet film thickness gauge. After air drying for 24 hours to form a solid textured interfacial layer, a gel coat material and fiberglass composite laminate were applied to each coated mold and cured, after which the resulting cured panels were removed from the molds. The adhesion of the interfacial layers to the panels was then observed at nominal room temperature and humidity, after which the dry film thicknesses of the interfacial layers were measured using a film thickness gauge.

Table 1 summarizes the results of this investigation.

TABLE 1

| Dry Film Thickness | Observations |
|---|---|
| 0.04 ± 0.01 mm | Tore easily; very difficult to remove |
| 0.12 ± 0.02 | Removed with little tearing |
| 0.16 ± 0.02 | Removed easily with no tearing |
| 0.21 ± 0.02 | Premature removal during panel demolding |
| 0.25 ± 0.02 | Premature removal during panel demolding |

The results indicated that a minimum dry film thickness of about 0.1 mm was necessary to facilitate the removal of the interfacial layers from the panels, while dry film thicknesses of greater than 0.18 mm resulted in the interfacial layers preferentially adhering to the molds instead of the panels. From these results, it is believed that spraying a mold release on the textured surface of the interfacial layer could further reduce the minimum film thickness, though also increasing processing costs. A suitable mold release for this purpose would be Frekote-700, commercially available from Frekote, though it is foreseeable that other mold release compositions could be used.

The drying time of the interfacial layers was shown to be a function of film thickness, air circulation and temperature. An undiluted coating solution deposited to a thickness of about 0.1 mm was found to have a drying time of less than 30 minutes at a temperature of about 42° C. using an air circulation of about 0.6 m/s.

In a second investigation, the ability to produce a dry interfacial layer on the mold with consistent texture was evaluated. Several tests were conducted to determine the optimum method of spraying the solution for the interfacial layer. As before, nominal room temperature and humidity levels and a slight negative pressure were established in a spray booth. Molds in the form of flat glass plates (30×30 cm) were placed in a horizontal position in the booth. Prior to spraying, the surfaces of the plates were prepared with a mold release agent. Spray pressures, nozzles and spray distances were varied throughout the tests in attempts to achieve a uniform texture. Since the texture of an interfacial layer is the negative image of the texture of the final article, visual observations of the interfacial layers were considered to be a sufficient quality control measure.

Initial attempts to deposit interfacial layers using gravity and siphon pot spray guns produced a spray pattern that contained very little material, necessitating a considerable amount of time to build up the desired layer thickness. Varying the spray pressure did not resolve this problem. Furthermore, the viscosity of the coating material was sufficiently high to counteract the siphoning effect of the guns, even with the assistance of gravity in the gravity gun. Attempts to reduce the viscosity of the solution by further dilution with water enabled the solution to be more consistently sprayed with a reasonable amount of material flow out of the gun. However, the coating solution did not produce an acceptable degree of graininess. Instead, the deposited solution tended to flow on the surfaces of the molds, causing a soft ripple-like effect rather than the leather-like effect that was sought. In contrast, a pressure pot spray gun was demonstrated to be able to spray the solution in an undiluted form to quickly produce a leathery looking texture. However, a complication with using spray guns that employ dry compressed air to transport the coating solution was that the coating solution began to cure while in the high velocity dry air within the gun head, producing pockets of dried coating film. This film would eventually break off and deposit on the mold, resulting in contamination of the textured interfacial layer.

To avoid the above problem, airless power spray systems were evaluated. Such systems are designed to spray materials with viscosities higher than what is feasible with siphon and gravity pot gun systems. The flow of the material can be regulated by either changing the spray nozzle or the speed of the spray motor. An undesirable pulsing effect was produced with one type of airless spray gun, indicating that, even if diluted, the viscosity of the coating solution was too high to produce the desirable effects. However, excellent results were obtained with a second airless spray system commercially available from Glasscraft and designed specifically for spraying high viscosity materials. This spray system uses a 35:1 master pump that feeds the coating solution to a one-component airless spray gun. With a small orifice spray nozzle (about 0.75 mm) and low air pressures (15 to 40 psi (about 1 to 2.8 bar)), the spray system achieved a relatively fine and uniform graininess that resembled leather. Using the same air pressure, a larger orifice spray nozzle (about 2.0 mm) produced a significantly coarser grain texture. In both cases, the spray pattern was very consistent and did not demonstrate any of the problems that plagued the other spray technologies that were investigated.

Though several passes of the airless spray gun were needed to build up an acceptable film layer thickness of about 0.1 mm, the time required was less than two minutes. After drying the deposited coating solutions to yield interfacial layers of suitable thickness, fiberglass composite panels were formed on these molds. When removed from the molds, each panel exhibited uniform graininess whose texture was dependent on the pump pressure and spray orifice diameter. Therefore, it was concluded that the Glasscraft spray system was suitable for depositing interfacial layers suitable for purposes of this invention.

In an additional evaluation of the Glasscraft spray system, 1×1 foot (about 0.3×0.3 m) glass plate molds were coated with a layer of the same Mirror Glaze release wax used in a previous evaluation. A polyvinyl acetate solution was sprayed on some of the molds at a pressure of about 15 psi (about 1 bar), a nozzle diameter of about 0.75 mm, and a spray distance of about 36 inches (about 0.9 m). Under these conditions, a fine misting spray was produced, depositing a fine grain texture on the molds. On other molds, the polyvinyl acetate solution was sprayed at a pressure of about 30 psi (about 2 bar), a nozzle diameter of about 2.0 mm, and a spray distance of about 12 inches (about 0.3 m). Under these conditions, a dense spray was produced, depositing a more localized pattern with a large coarse grain texture on the molds. From this investigation, it was shown that the degree of textured finish could be readily controlled by adjusting the pressure, nozzle size and spray distance of an airless spray gun.

Finally, the polyvinyl acetate solution was sprayed on the remaining molds using a two-step process. The first step was to rapidly build up a thick base layer of the coating solution using coarse spray parameters; namely, a pressure of about 30 psi (about 2 bar), a nozzle diameter of about 2.0 mm, and a spray distance of about 12 inches (about 0.3 m). Thereafter, the coating solution was deposited as a fine misting spray to produce a fine grain texture using the fine spray parameters; namely, a pressure of about 15 psi (about 1 bar), a nozzle diameter of about 0.75 mm, and a spray distance of about 36 inches (about 0.9 m). In this manner, a fine grain textured interfacial layer was produced more rapidly than that possible using only the fine spray parameters.

From the above, it can be seen that a significant advantage of the present invention is that a removable textured coating can be employed as an alternative means for generating a textured finish on the surface of a composite article produced with an open tool molding process. As a result, the invention overcomes the prior requirement for using an expensive textured steel mold to produce textured composite articles. Instead, less durable mold materials can be used to form molds with untextured (i.e., smooth) mold surfaces, which are then coated with the textured interfacial layer of this invention to impart the desired textured surface to the composite articles. While certain spray systems, spray parameters and coating solutions were evaluated and demonstrated as being capable of producing a desirable textured interfacial layer, it is foreseeable that other systems, parameters and materials could be used. Accordingly, the scope of the invention is to be limited only by the following claims.

What is claimed is:

1. An open tool molding process for producing a composite article with a textured surface, the method comprising the steps of:

depositing a mold release composition on an untextured mold surface of an open tool mold, the mold surface being defined by a polymeric material;

spraying a polymeric solution on the mold surface so that the polymeric solution forms a textured interfacial layer having a thickness of about 0.10 to about 0.18 mm on the mold sureface, the solution being an aqueous polymeric solution chosen from the group consisting of polyvinyl acetate solutions and acrylic latex emulsions;

depositing a gel coat layer on the textured interfacial layer so that the gel coat layer has a surface textured by the textured interfacial layer;

depositing on the gel coat layer a polymeric material containing a dispersion of fiber material;

curing the textured interfacial layer, the gel coat layer and the polymeric material so that the cured polymeric material with the fiber material dispersed therein forms a fiber-reinforced composite article having a textured surface defined by the cured gel coat layer, the textured interfacial layer overlying the textured surface;

removing the composite article from the mold so that the textured interfacial layer remains as a protective film on the textured surface of the composite article; and then removing the textured interfacial layer from the composite article to reveal the textured surface of the composite article.

2. The open tool molding process according to claim 1, wherein the textured interfacial layer is removed from the composite article after the composite article has been transported to a site remote from the mold.

3. The open tool molding process according to claim 1, wherein the polymeric solution is deposited using an airless spray gun.

4. The open tool molding process according to claim 3, wherein the interfacial layer is deposited by spraying the polymic solution through a first orifice to form a first sublayer of the textured interfacial layer, and then spraying the polymeric solution through a second orifice to form a second sublayer of the textured interfacial layer, the second being smaller than the first oriface such that second sublayer is finer textured than the first sublayer.

5. The open tool molding process according to claim 1, wherein the gel coat layer is formed of a composition comprising the polymeric material.

6. The open tool molding process according to claim 1, wherein the polymeric solution is dried prior to depositing the gel coat layer, and the gel coat layer is partially cured prior to depositing the polymeric material containing the dispertion of fiber material.

7. The open tool molding process according to claim 1, further comprising the step of depositing a mold release composition on the textured interfacial layer prior to depositing the gel coat layer.

\* \* \* \* \*